B. GOLDMAN.
APPARATUS FOR STIRRING, AGITATING, OR MIXING LIQUIDS.
APPLICATION FILED FEB. 18, 1914.
1,191,585.
Patented July 18, 1916.
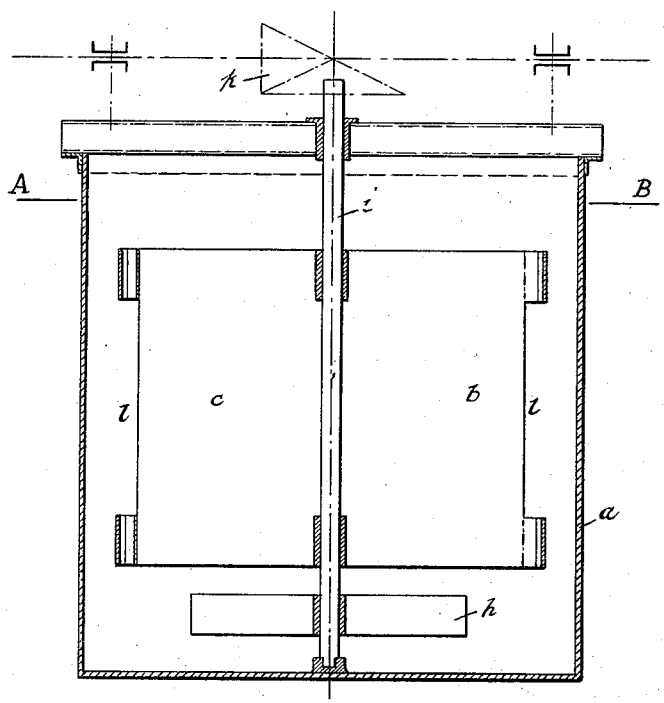
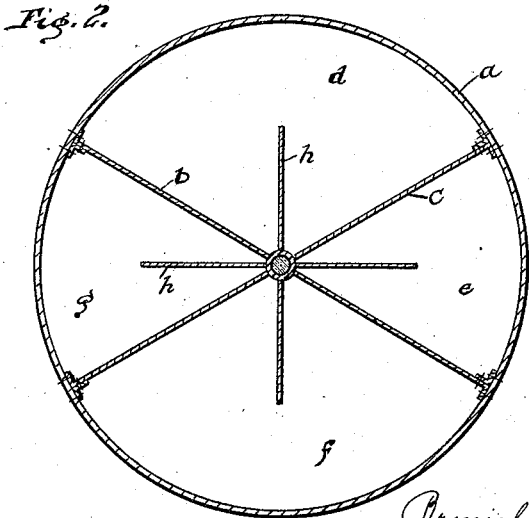

UNITED STATES PATENT OFFICE.

BRONISLAW GOLDMAN, OF CHARLOTTENBURG, GERMANY.

APPARATUS FOR STIRRING, AGITATING, OR MIXING LIQUIDS.

1,191,585. Specification of Letters Patent. Patented July 18, 1916.

Application filed February 18, 1914. Serial No. 819,604.

*To all whom it may concern:*

Be it known that I, Dr. BRONISLAW GOLDMAN, subject of the Russian Empire, residing at 102/103 Wilmersdorferstrasse, in the city of Charlottenburg, German Empire, have invented certain new and useful Improvements in Apparatus for Stirring, Agitating, or Mixing Liquids, of which the following is a full, clear, and exact description.

This invention relates to a new or improved mixing or agitating device or apparatus and relates to mixing devices in which the vessel provided with any desired mixing mechanism is divided by means of walls into compartments communicating with one another.

The invention consists in the provision of walls which are so shaped and positioned that the compartments formed thereby are of unequal size. By this arrangement of compartments of various size communicating with one another and in consequence of the various capacities of such compartments a flow of varying rapidity and consequently an extraordinarily intense intermingling and mixing action is obtained.

In the drawing showing a form of construction of the invention Figure 1 is a vertical section through the mixing device and Fig. 2 a transverse section upon the line A—B of Fig. 1.

As may be seen from Fig. 2, two walls $b$ $c$ crossing one another at an acute angle are secured in such a manner that the inclosed compartments are of various sizes, and in the form of construction shown a circular series is composed of a large compartment, $d$, a small one $e$, then another large compartment $f$ and finally a small compartment $g$ which adjoins the compartment $d$. The wall $b$ or the wall $c$ or both walls $b$ and $c$ may however, only reach from the wall of the vessel to the center which would only leave three or two compartments of various sizes communicating with one another, and vice versa more than two intersecting walls may be provided, but always in such a manner that at least some of the compartments inclosed by them are of various sizes.

The most advantageous arrangement is for compartments of large size to alternate with smaller or small compartments. Of course the walls may be shaped and arranged in such a manner that compartments of various capacities may be made of any desired equal or different cross sectional form.

$h$ are beaters rotatable by means of the vertical shaft $i$ driven by suitable gearings $k$ which beaters revolve in well known manner beneath the walls $b$, $c$. The mixing mechanism may however be of any other desired kind, for example it may be situated in the upper part or in the center of the vessel. In the latter case the walls, as is easily understood, may be arranged partly above and partly below.

The partitions $b$ $c$ are preferably recessed at the place where they adjoin the wall of the vessel over a portion of the height thereof. The notches 1 thus produced serve to permit of the passage of the liquid from one chamber into the other, thus enhancing the mixing action or effect. These notches may, however, in a well known manner, be arranged at another place on the walls or at different heights.

I claim:

A mixing apparatus comprising a vessel, a shaft extending through the vessel, partitions radiating from the shaft, said partitions forming compartments of unequal sizes, the upper and lower edges of the compartments being spaced from the top and bottom of the vessel, a portion of the ends of the partitions being spaced from the inner walls of the vessel to provide communication between the compartments, and a stirring member mounted on one extremity of the shaft, whereby material stirred by the stirring member is thrown against the walls of the partitions, substantially as described.

In witness whereof, I subscribe my signature, in presence of two witnesses.

Dr. BRONISLAW GOLDMAN.

Witnesses:
 WOLDEMAR HAUPT,
 HENRY HASPER.

Copies of this patent may be obtained for five cents each, by addressing the "Commissioner of Patents, Washington, D. C."